United States Patent
Yan et al.

(10) Patent No.: US 10,962,654 B2
(45) Date of Patent: Mar. 30, 2021

(54) MULTIPLE-POSITIONING-SYSTEM SWITCHING AND FUSED CALIBRATION METHOD AND DEVICE THEREOF

(71) Applicant: AUTOMOTIVE RESEARCH & TESTING CENTER, Changhua County (TW)

(72) Inventors: Yi Yan, Changhua County (TW); You-Shyan Lin, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 338 days.

(21) Appl. No.: 16/238,746

(22) Filed: Jan. 3, 2019

(65) Prior Publication Data

US 2020/0150281 A1 May 14, 2020

(30) Foreign Application Priority Data

Nov. 9, 2018 (TW) .................... 107139743

(51) Int. Cl.
*G01S 19/49* (2010.01)
*G01S 19/43* (2010.01)
(Continued)

(52) U.S. Cl.
CPC ............. *G01S 19/49* (2013.01); *G01C 21/30* (2013.01); *G01S 17/86* (2020.01); *G01S 19/43* (2013.01)

(58) Field of Classification Search
CPC .......... G01S 19/49; G01S 19/43; G01S 19/44; G01S 5/02; G01S 17/86; G01C 21/30; G01C 15/00
(Continued)

(56) References Cited

U.S. PATENT DOCUMENTS

2008/0027591 A1* 1/2008 Lenser ................. G05D 1/0251
701/2
2012/0271540 A1* 10/2012 Miksa ................... B60W 30/12
701/409
(Continued)

FOREIGN PATENT DOCUMENTS

WO WO-2018060313 A1 * 4/2018 ............. G01S 17/89

*Primary Examiner* — Harry K Liu
(74) *Attorney, Agent, or Firm* — Muncy, Geissler, Olds & Lowe, P.C.

(57) ABSTRACT

A multiple-positioning-system switching and fused calibration method and a device thereof are provided. A first sensing device generates first sensing information, and the central processor calculates the first positioning information of a current position according to the first sensing information and a starting position, and downloads map information from the cloud database. A second sensing device detects a feature object, and obtains the distance information of the feature object and the current position, to the central processor. The central processor calculates a current position in the map information, and generates second positioning information, and performs fused calculation on the first positioning information and the second positioning information according to the weight values of a weight distribution table, to generate new first positioning information to replace the first positioning information. As a result, the positioning information generated by different devices can be fused to effectively calibrate positioning information.

17 Claims, 5 Drawing Sheets

(51) Int. Cl.
*G01C 21/30* (2006.01)
*G01S 17/86* (2020.01)
(58) Field of Classification Search
USPC .................................................. 342/357.26
See application file for complete search history.

(56) References Cited

U.S. PATENT DOCUMENTS

| | | | |
|---|---|---|---|
| 2012/0323446 A1* | 12/2012 | Bar | B62D 6/04 701/42 |
| 2014/0323148 A1* | 10/2014 | Schmalstieg | G01C 21/20 455/456.1 |
| 2017/0358204 A1* | 12/2017 | Modica | G07C 5/0841 |
| 2018/0216937 A1* | 8/2018 | Mielenz | G06K 9/00805 |
| 2019/0063929 A1* | 2/2019 | Ohyama | G05D 1/021 |
| 2020/0158869 A1* | 5/2020 | Amirloo Abolfathi | G01S 7/497 |

* cited by examiner

MULTIPLE-POSITIONING-SYSTEM SWITCHING AND FUSED CALIBRATION METHOD AND DEVICE THEREOF

This application claims priority for Taiwan patent application no. 107139743 filed on Nov. 9, 2018, the content of which is incorporated by reference in its entirety.

BACKGROUND OF THE INVENTION

1. Field of the Invention

The present invention relates to a positioning system, more particularly to a multiple-positioning-system switching and fused calibration method which is able to fuse various positioning signals, and a device thereof.

2. Description of the Related Art

In recent years, the positioning technology applied on the vehicles mostly uses a positioning system such as a satellite positioning system, an inertial positioning system or a computer vision positioning system to provide positioning information to driver, an automatic driver assistance system (ADAS), or an autonomous Driving System (ADS) for further use.

The satellite positioning system, such as a global positioning system (GPS), a global navigation satellite system (GLONASS), a BeiDou positioning system, a Galileo positioning system, and the like, uses a triangulation positioning principle for position calculation. The satellite positioning system can provide absolute coordinates and heading angle information, but it is easily affected by weather clouds, or it does not work when the satellite signal is too weak to use, for example, in a basement or tunnel.

The inertial positioning system uses an inertial sensor, such as an acceleration sensor, an angular velocity sensor or a wheel speed sensor to detect data of distance, angle or speed, and calculates a relative distance according to the above-mentioned data and previous time point, so as to generate positioning information. The inertial positioning system is not affected when the satellite signal is shielded, or not affected by multipath effect, but the continuous positions are calculated based on the movement of the vehicle, and it gradually causes a cumulative error after long-term usage.

The computer vision positioning system uses a Lidar or a camera to recognize a feature object in road environment, and then retrieves and compares the feature object in a pre-established map information system, thereby estimating a current position of the vehicle. The technology of computer-vision positioning system can achieve the positioning accuracy of centimeter-level by recognizing feature object in environment, but it is necessary to establish a good map information system and recognition method; otherwise, the computer-vision positioning system is easy to misjudge the current position; furthermore, the Lidar and camera are affected easily by light or weather.

According to above mentioned content, it is obvious that the inertial positioning system, the satellite positioning system or the computer vision positioning system may provide incorrect positioning information subject to different weather or environmental factors. Therefore, if the positioning information can be timely calibrated to make the positioning information more accurate, the misjudgment of the driver or the automatic assisted driving system can be effectively reduced and the safety of driving can be improved.

SUMMARY OF THE INVENTION

An objective of the present invention is to provide a multiple-positioning-system switching and fused calibration method, and a device thereof. The multiple-positioning-system switching and fused calibration method can perform fusion on positioning messages generated by various sensing devices with each other, so as to perform effective positioning calibration for current environment, thereby optimizing positioning information.

Another objective of the present invention is to provide a multiple-positioning-system switching and fused calibration method, and a device thereof, and the multiple-positioning-system switching and fused calibration method can generate positioning information which can still keep a certain degree of accuracy even if subject to different environmental factors, so as to reduce misjudgment of the positioning information.

According to an embodiment, the present invention provides a multiple-positioning-system switching and fused calibration method, and the method comprises steps of: (a) selecting and using at least one first sensing device to generate first sensing information, and calculating a current position according to a starting position and the first sensing information, to generate first positioning information; (b) transmitting the first positioning information to a cloud database; (c) downloading corresponding map information corresponding to the first positioning information, from the cloud database; (d) using at least one second sensing device to detect whether at least one feature object exists in ambient environment, and when no feature object exists in ambient environment, returning to the step (a), and when at least one feature object exists in ambient environment, obtaining distance information between the detected feature object and the current position, and selecting the corresponding map information comprising the detected feature object; (e) according to a position of the feature object in the map information and the distance information, calculating the current position in the map information, and generating second positioning information according to the current position; and (f) obtaining weight values corresponding to the first sensing device and the second sensing device according to the at least one weight distribution table, and performing fused calculation on the first positioning information and the second positioning information according to the weight values, to generate new first positioning information for replacing the first positioning information, and return to the step (b).

Preferably, generation of the weight distribution table comprises steps of: using a plurality of sensing devices to generate the plurality of pieces of sensing information, and calculating a plurality of pieces of reference positioning information according to the starting position and the plurality of pieces of sensing information; comparing the plurality of pieces of reference positioning information with standard positioning information of the standard positioning device, to generate a plurality of distance error values; storing the plurality of distance error values, and calculating confidence values of the plurality of distance error values according to a confidence calculation equation below:

$$C = Pr(w < v(x))$$

wherein C is the confidence value, w is the distance error value, v(x) is a tolerable error range; and providing the sensing device having higher confidence value with the higher weight value, and storing the plurality of sensing devices and the weight values corresponding to the plurality of sensing devices, so as to generate the weight distribution table.

Preferably, the step (c) further comprises: determining whether the cloud database comprises two-dimensional map information corresponding to the first positioning information; downloading the at least one two-dimensional map information when the cloud database comprises the two-dimensional map information corresponding to the first positioning information, and executing the step (d); and when the cloud database does not comprise the two-dimensional map information corresponding to the position in the first positioning information, downloading at least one three-dimensional map information, and directly using a position in the three-dimensional map information corresponding to the first positioning information as the new first positioning information, to replace the first positioning information, and returning to step (b).

According to an embodiment, the present invention provides a multiple-positioning-system switching and fused calibration device comprising at least one first sensing device, at least one second sensing device, and a central processor. The at least one first sensing device is configured to generate first sensing information. The at least one second sensing device is configured to detect at least one feature object, and obtain distance information between the detected feature object and a current position. The central processor is electrically connected to the first sensing device and the second sensing device, and configured to receive the first sensing information and the distance information, and calculate the current position according to the starting position and the first sensing information, to generate first positioning information and transmit the first positioning information to a cloud database. The cloud database transmits map information corresponding to the first positioning information, to the central processor, and the central processor calculates the current position in the map information according to the position of the feature object in the map information and the distance information, and generates the second positioning information according to the current position, and the central processor obtains weight values corresponding to the first sensing device and the second sensing device according to at least one weight distribution table, and performs fused calculation on the first positioning information and the second positioning information according to the weight values, so as to generate new first positioning information for replacing the first positioning information.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
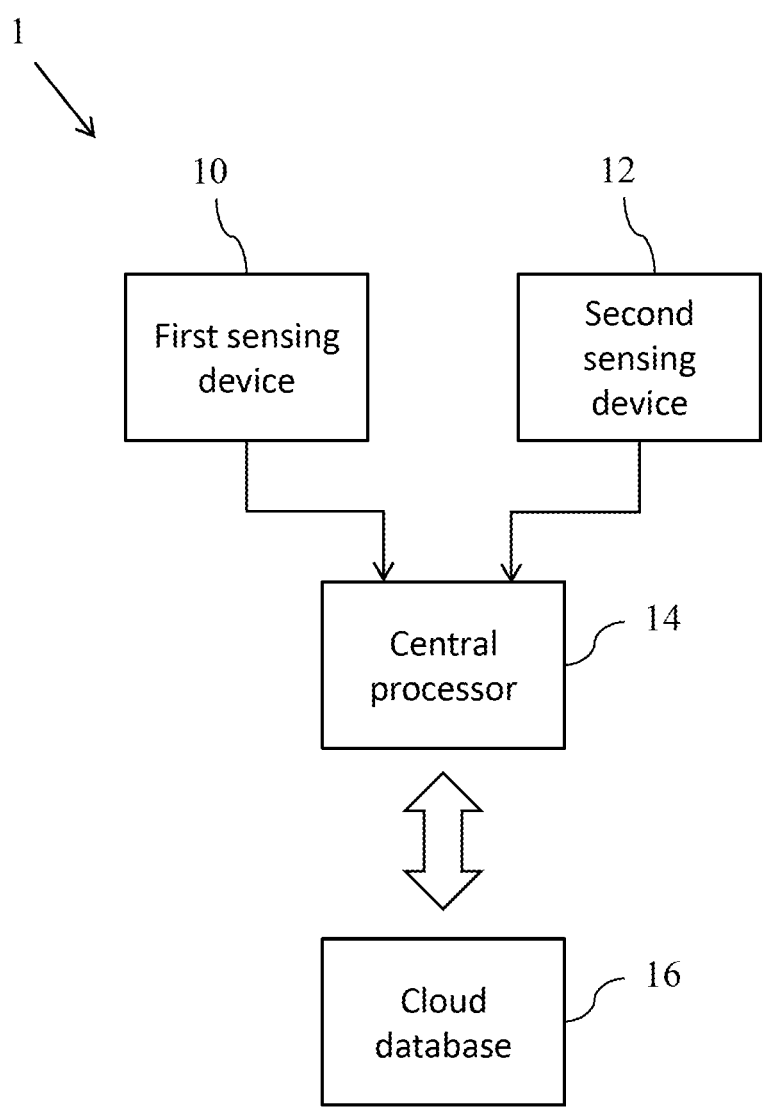
FIG. 1 is a block diagram of a system of the present invention.

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be understood that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be understood to imply the inclusion of stated elements but not the exclusion of any other elements.

The present invention provides a multiple-positioning-system switching and fused calibration method and a device thereof, to perform effective positioning calibration in current environment, thereby optimizing positioning information. Please refer to FIG. 1, which shows a system structure of a multiple-positioning-system switching and fused calibration device 1, according to the present invention. The multiple-positioning-system switching and fused calibration device 1 of this embodiment can be installed on a vehicle and serve as a positioning device of a vehicle machine system of the vehicle. The multiple-positioning-system switching and fused calibration device 1 can comprise at least one first sensing device 10, at least one second sensing device 12, a central processor 14 and a cloud database 16. The first sensing device 10 and the second sensing device 12 are electrically connected to the central processor 14, and the central processor 14 can be linked with the cloud database 16.

Each of the first sensing device 10 and the second sensing device 12 can be, for example, an inertial sensing device or an optical sensing device. In this embodiment, the first sensing device 10 can be, for example, an inertial sensing device, such as angular velocity sensing device or a global positioning system (GPS) device. The second sensing device 12 can be the optical sensing device, such as a camera device or a LIDAR sensor. The central processor 14 can be a computer device for performing data process. In this embodiment, the central processor 14 stores at least one weight distribution table which records titles and weight values corresponding to a plurality of sensing devices. The cloud database 16 can be a computer device disposed in a remote location, and the cloud database 16 stores multiple pieces of map information which have different types and are for different locations. For example, a set of two-dimensional lane line map information, traffic sign map information, three-dimensional point cloud or three-dimensional RGB-D map information, can be stored for each different location.

In this embodiment, the central processor 14 can store, for example, a plurality of weight distribution tables, the map information of different location can correspond to different weight distribution table. As a result, in the present invention, the map information of different locations can correspond to different weight distribution table, so as to provide the sensing devices with different weight distribution at different location.

Figure 2:
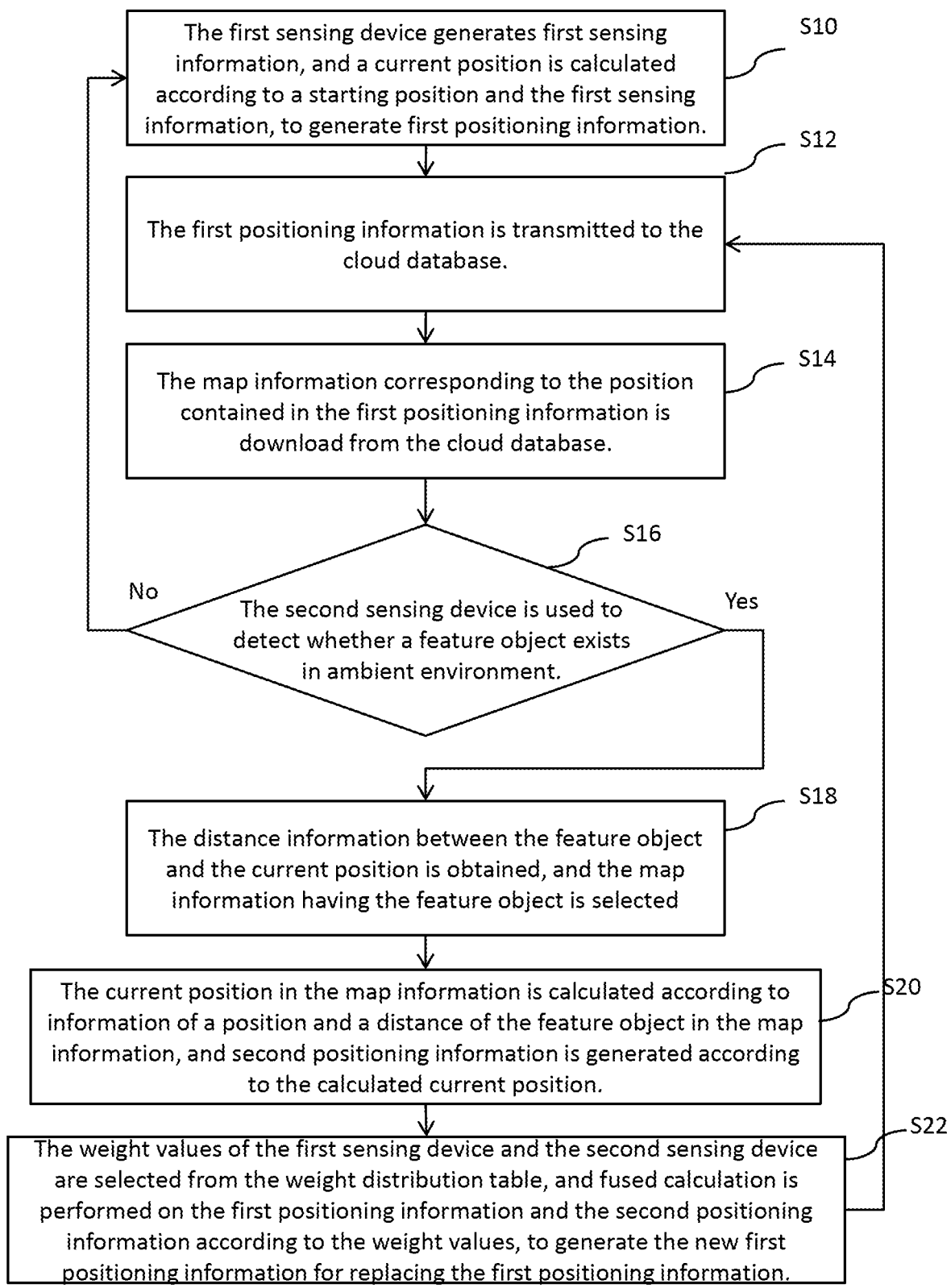
FIG. 2 is a flowchart showing the steps in an operation of a method of the present invention.

A flow of the operation of the positioning and calibration method of the present invention is illustrated in detail with reference to FIGS. 1 and 2. First, in a step S10, at least one first sensing device 10 is selected, and the selected first sensing device 10 can generate and transmit first sensing information to the central processor 14. In this embodiment, the first sensing device 10 can be, for example, the angular velocity sensing device. The central processor 14 can calculate a current position of the vehicle according to a starting position, and information of distance, speed and angle contained in the first sensing information, so as to generate first positioning information.

Figure 3:
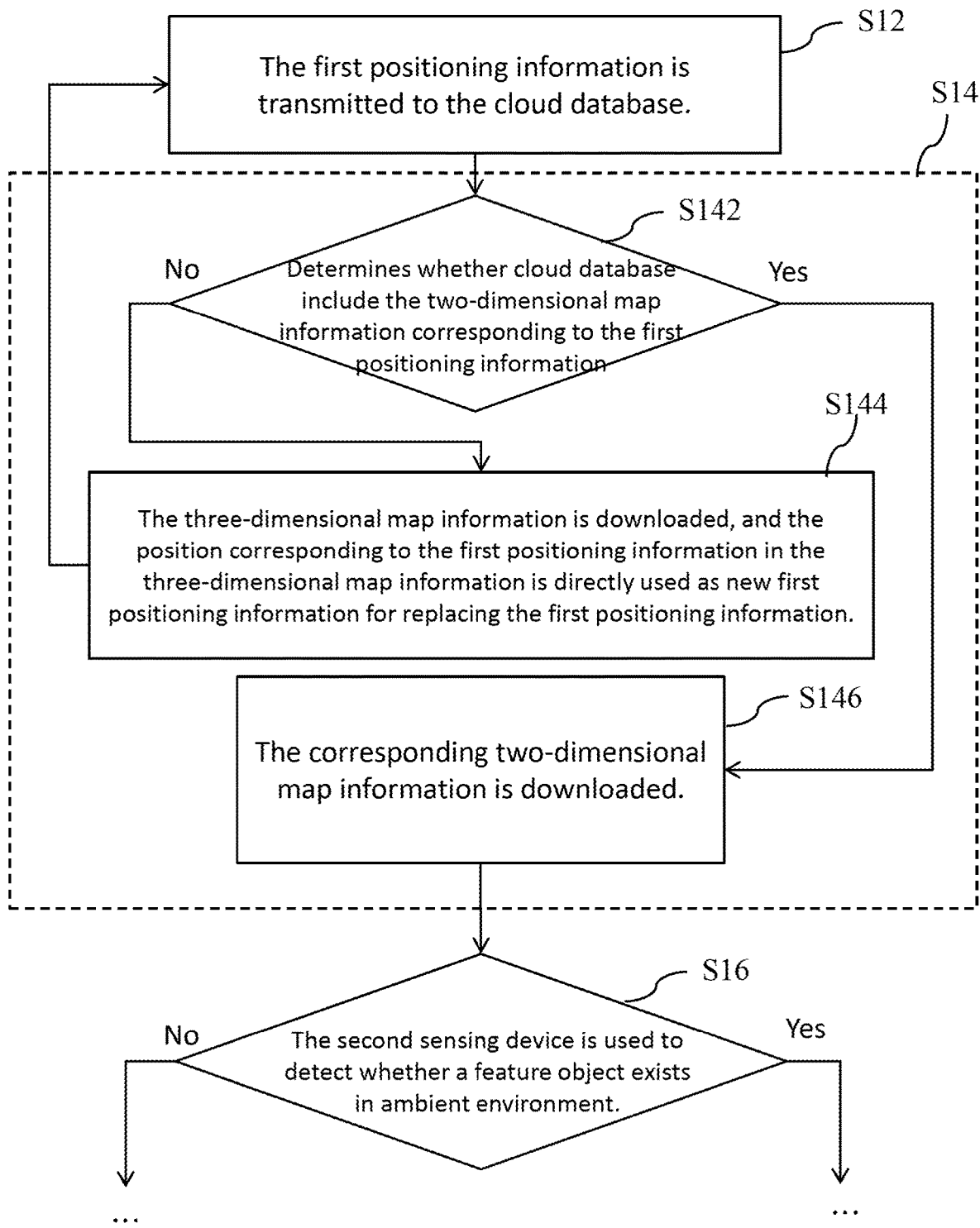
FIG. 3 is a flowchart showing the steps in an operation of downloading map information, according to the present invention.

Next, in a step S12, the central processor 14 transmits the first positioning information to the cloud database 16, and in a step S14, the map information corresponding to the position contained in the first positioning information is download from the cloud database 16. In an embodiment, the step of downloading the map information comprises determining whether the cloud database 16 stores the two-dimensional map information corresponding to the position contained in the first positioning information, and the detailed illustration will be described in reference with FIG. 3. In a step S142, during the process of downloading the map information, the cloud database 16 can determine whether all pieces of the two-dimensional map information includes the two-dimensional map information in a range of 15 m ahead the position contained in the first positioning information, and in a step S144, when the cloud database 16 does not store the two-dimensional map information matching above-mentioned condition, the cloud database 16 directly provides the at least one three-dimensional map information containing the first positioning information for the central processor 14 to download. The positioning accuracy of the three-dimensional map information is high, so the central processor 14 can directly use the position corresponding to the first positioning information in the three-dimensional map information as new first positioning information for replacing the first positioning information, and the flow returns to the step S12 of transmitting the first positioning information to the cloud database 16. In the other hand, in the step S146, when the cloud database 16 stores the two-dimensional map information matching the above-mentioned condition, the cloud database 16 allows the central processor 14 to download all pieces of two-dimensional map information matching the above-mentioned condition, and the flow is operated to next step S16. The determination step in the step S14 is to determine, according to the first positioning information, whether the cloud database 16 stores the two-dimensional map information for downloading. When the cloud database 16 stores the two-dimensional map information, it is not necessary for the central processor 14 to download the three-dimensional map information having larger data amount, such as the point cloud. As a result, the method of the present invention has advantage of reducing data download amount.

Please refer back to FIGS. 1 and 2. In a step S16, after the central processor 14 downloads the useful two-dimensional map information, at least one second sensing device 12 is used to detect whether the at least one feature object exists in ambient environment. The feature object can be a lane line or a traffic sign. In this embodiment, the second sensing device 12 can be, for example, a camera device which can capture a front image, so that the central processor 14 can detect, according to the captured image, whether the feature object, such as lane line or traffic sign, is located in the front of the vehicle. When the central processor 14 detects absence of feature object, the flow returns to the step S10 of using the first sensing device 10 to generate the first sensing information and calculating the current position according to the starting position and the first sensing information, to generate the first positioning information. In a step S18, when the central processor 14 determines that a feature object is detected, the second sensing device 12 is used to obtain distance information between the feature object and the current position, and transmit the distance information to the central processor 14, and the central processor 14 can select the map information having the feature object. For example, in this embodiment, the feature object can be a traffic sign, the central processor 14 can obtain a distance between the detected traffic sign and the current position of the vehicle, so as to generate the distance information and search the map information having the traffic sign from a plurality of pieces of map information downloaded from the cloud database 16, and the flow is operated to next step S20.

In a step S20, the central processor 14 determines information of a position and a distance of the feature object in the map information, and calculates a current position in the map information, and generates a least one second positioning information according to the calculated current position. For example, the central processor 14 can search, from the traffic sign map information, a location corresponding to the traffic sign detected by the second sensing device 12, so as to obtain a coordinate point of the position of the traffic sign in the traffic sign map information, and the central processor 14 can calculate a coordinate point of the current position of the vehicle in the traffic sign map information according to the distance information, and use the calculated coordinate point as the second positioning information. In a step S22, the central processor 14 selects a weight distribution table corresponding to the map information, and obtains weight values of the first sensing device 10 and the second sensing device 12 from the selected weight distribution table, and performs fused calculation on the first positioning information and the second positioning information according to the weight values, so as to generate the new first positioning information for replacing the first positioning information, and the flow returns to the step of transmitting the first positioning information to the cloud database 16. For example, the central processor 14 can select the weight distribution table corresponding to the traffic sign map information of the location, and obtain the weight values of the first sensing device 10 and the second sensing device 12 stored in the selected weight distribution table, and perform fused calculation on the first positioning information and the second positioning information according to the weight values, so as to generate the new first positioning information for replacing the first positioning information.

According to above-mentioned content, the map information used in the present invention can be bi-directionally switched according to the positioning information, and when the vehicle installed with the multiple-positioning-system switching and fused calibration device 1 leaves the current position, the sensing device can continuously determine the first positioning information and switching the map information according to the first positioning information.

Figure 4:
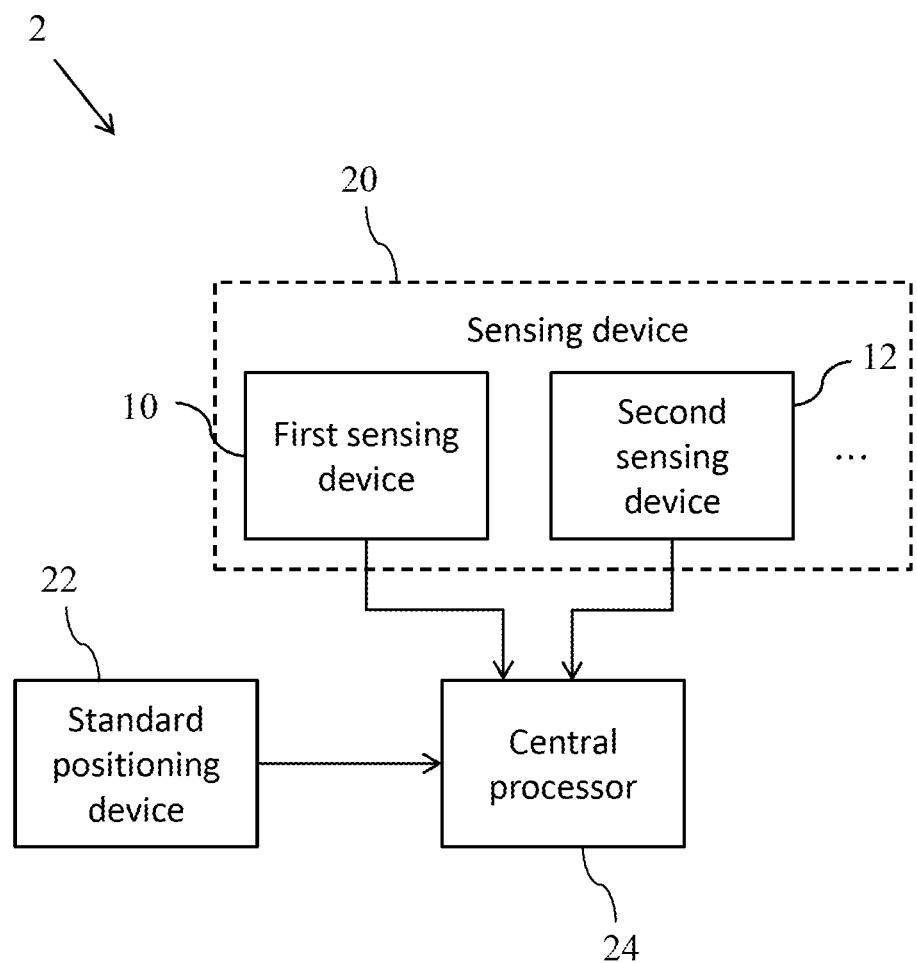
FIG. 4 is a block diagram of a system for establishing a weight distribution table, according to the present invention.
Figure 5:
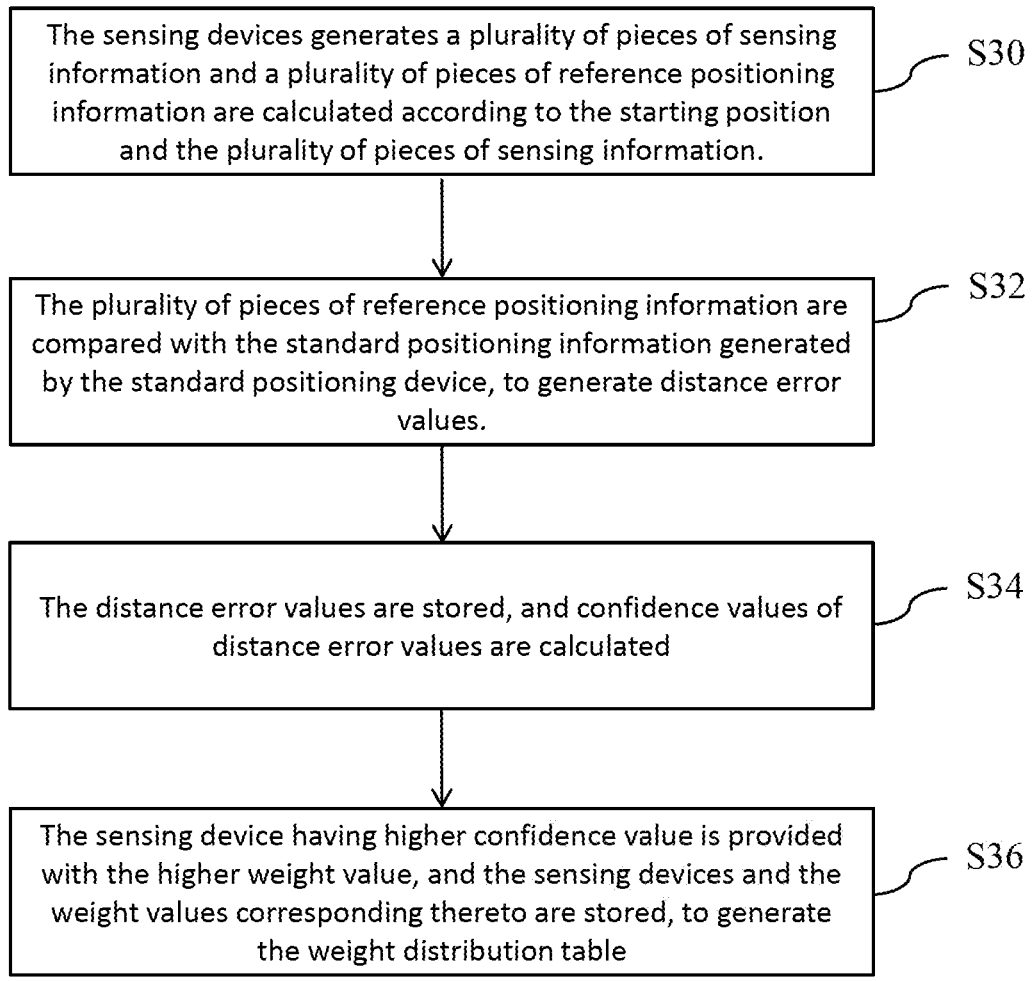
FIG. 5 is a flowchart showing the steps in an operation of establishing the weight distribution table, according to the present invention.

Please refer to FIGS. 4 and 5, which show the operation of obtaining the aforementioned weight distribution table. The system for establishing the weight distribution table is described in reference with FIG. 4. The weight distribution table establishing system 2 is also installed in the vehicle and can establish the weight distribution tables corresponding to the map information of different locations when the vehicle moves to different locations. The weight distribution table establishing system 2 comprises a plurality of sensing devices 20 comprising the first sensing device 10 and the second sensing device 12 above-mentioned. A standard positioning device 22 can be, for example, a real time kinematic (RTK) positioning device. The standard positioning device 22 can detect the current position to generate standard positioning information. Furthermore, the standard positioning device 22 can be the inertial positioning device or the optical positioning device. When satellite is shielded and the real-time kinematic signal is affected, it causes the inability of calculating the distance error value to generate the confidence parameter; in this case, the inertial positioning device or the optical positioning device can be used to generate the standard positioning information. Therefore, the standard positioning device 22 of the present invention is not limited to the real-time kinematic positioning device, and can also be the inertial positioning device or the optical positioning device. The central processor 24 can be a computer device which is electrically connected to the plurality of sensing devices 20 and the standard positioning device 22 and serves as a data processing device.

Please refer to FIG. 5, which shows steps of the operation of generating the weight distribution table of the present invention. In a step S30, the plurality of sensing devices 20 can be used to generate the plurality of pieces of sensing information within a range of a location, and a plurality of pieces of reference positioning information can be calculated according to the starting position and the plurality of pieces of sensing information respectively. For example, when the sensing device 20 is the acceleration sensing device, the central processor 14 can calculate the reference positioning information of the current position according to the starting position, and the distance, speed and angle in the sensing information; when the sensing device 20 is an image sensing device, the image sensing device can sense a feature object in front thereof, and after the distance information between the current position and the detected feature object is obtained, the reference positioning information of the current position can be calculated according to the position of the feature object in the map information and the distance information.

Next, in a step S32, the central processor 24 can compare the plurality of pieces of reference positioning information with the standard positioning information generated by the standard positioning device 22, to generate the plurality of distance error values. Next, in a step S34, the central processor 24 stores the plurality of distance error values, and calculates a confidence value of each distance error value according to a confidence calculation equation below, $$C=Pr(w<v(x))$$

wherein C is the confidence value, w is the distance error value, v(x) is a tolerable error range.

In a step S36, after the confidence value of each sensing device is generated, the central processor 24 provides the sensing device 20 having higher confidence value with the higher weight value, and stores the plurality of sensing devices 20 and the weight values corresponding thereto, so as to generate the weight distribution table.

Next, the user can move to next location range and perform the above-mentioned weight distribution table establishment method again, to generate another weight distribution table. As a result, the technical solution of the present invention can generate different weight distribution table for the map information of different location, and when the positioning information is calibrated, the device and method of the present invention can determine different weights for sensing devices in different environment, so that the positioning device can be effectively calibrated according to current environment while the positioning information is calibrated, thereby optimizing the positioning information.

According to above-mentioned content, the present invention can perform fused calculation on the pieces of positioning information generated by various sensing devices, so as to effectively calibrate the positioning information for current environment, thereby optimizing the positioning information; furthermore, the generated positioning information can still keep a certain degree of accuracy even if being subject to different environmental factors, thereby reducing misjudgment of positioning information.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A multiple-positioning-system switching and fused calibration method, comprising,
    (a) selecting at least one first sensing device to generate first sensing information, and calculating a current position according to a starting position and the first sensing information, to generate first positioning information;
    (b) transmitting the first positioning information to a cloud database;
    (c) downloading corresponding map information according to the first positioning information, from the cloud database;
    (d) detecting whether at least one feature object exists in ambient environment using at least one second sensing device, and when no feature object exists in ambient environment, returning to the step (a), and when at least one feature object exists in ambient environment, obtaining distance information between the detected feature object and the current position, and selecting the corresponding map information comprising the detected feature object;

(e) according to a position of the feature object in the map information and the distance information, calculating the current position in the map information, and generating second positioning information according to the current position; and (f) obtaining weight values corresponding to the first sensing device and the second sensing device according to at least one weight distribution table, and performing fused calculation on the first positioning information and the second positioning information according to the weight values, to generate new first positioning information for replacing the first positioning information, and return to the step (b).

2. The multiple-positioning-system switching and fused calibration method according to claim 1, wherein generation of the weight distribution table comprises:

generating the plurality of pieces of sensing information using a plurality of sensing devices, and calculating a plurality of pieces of reference positioning information according to the starting position and the plurality of pieces of sensing information;

comparing the plurality of pieces of reference positioning information with standard positioning information of a standard positioning device respectively, to generate a plurality of distance error values;

storing the plurality of distance error values, and calculating confidence values of the plurality of distance error values according to a confidence calculation equation below:

$$C=Pr(w<v(x))$$

wherein C is the confidence value, W is the distance error value, v(x) is a tolerable error range; and providing the sensing device having higher confidence value with the higher weight value, and storing the plurality of sensing devices and the weight values corresponding to the plurality of sensing devices, so as to generate the weight distribution table.

3. The multiple-positioning-system switching and fused calibration method according to claim 2, wherein the standard positioning device is a real-time kinematic positioning device.

4. The multiple-positioning-system switching and fused calibration method according to claim 1, wherein the feature object is a lane line or a traffic sign.

5. The multiple-positioning-system switching and fused calibration method according to claim 1, wherein the step (c) further comprises:

determining whether the cloud database comprises two-dimensional map information corresponding to the first positioning information;

downloading the at least one two-dimensional map information when the cloud database comprises the two-dimensional map information corresponding to the first positioning information, and executing the step (d); and when the cloud database does not comprise the two-dimensional map information corresponding to the position in the first positioning information, downloading at least one three-dimensional map information, and directly using a position in the three-dimensional map information corresponding to the first positioning information as the new first positioning information, to replace the first positioning information, and returning to step (b).

6. The multiple-positioning-system switching and fused calibration method according to claim 5, wherein the three-dimensional map information is three-dimensional point cloud information or RGB-D map information.

7. The multiple-positioning-system switching and fused calibration method according to claim 5, wherein the two-dimensional map information is lane line positioning map information or traffic sign map information.

8. The multiple-positioning-system switching and fused calibration method according to claim 1, wherein the first sensing device is an inertial sensing device, and the second sensing device is an optical sensing device.

9. A multiple-positioning-system switching and fused calibration device, comprising:

at least one first sensing device configured to generate first sensing information;

at least one second sensing device configured to detect at least one feature object, and obtain distance information between the detected feature object and a current position; and a central processor electrically connected to the first sensing device and the second sensing device, and configured to receive the first sensing information and the distance information, and calculate the current position according to the starting position and the first sensing information, to generate first positioning information and transmit the first positioning information to a cloud database, wherein the cloud database transmits map information corresponding to the first positioning information, to the central processor, and the central processor calculates the current position in the map information according to the position of the feature object in the map information and the distance information, and generates the second positioning information according to the current position, and the central processor obtains weight values corresponding to the first sensing device and the second sensing device according to at least one weight distribution table, and performs fused calculation on the first positioning information and the second positioning information according to the weight values, so as to generate new first positioning information for replacing the first positioning information.

10. The multiple-positioning-system switching and fused calibration device according to claim 9, wherein the at least one weight distribution table comprises titles and weight values of corresponding to a plurality of sensing devices.

11. The multiple-positioning-system switching and fused calibration device according to claim 9, wherein a plurality of sensing devices are used to generate the plurality of pieces of sensing information, and the plurality of pieces of reference positioning information are calculated according to the starting position and the plurality of pieces of sensing information, and the plurality of pieces of reference positioning information are compared with standard positioning information of a standard positioning device to generate a plurality of distance error values respectively, and a plurality of confidence values of distance error values are calculated according to a confidence calculation equation below:

$$C=Pr(w<v(x))$$

wherein C is the confidence value, w is the distance error value, v(x) is a tolerable error range; and the sensing device having higher confidence value is provided with the higher weight value, and the plurality of sensing devices and the corresponding weight values are stored to generate the weight distribution table.

12. The switching and fused calibration device according to claim 11, wherein the standard positioning device is a real-time kinematic positioning device.

13. The switching and fused calibration device according to claim 9, wherein the feature object is a lane line or a traffic sign.

14. The switching and fused calibration device according to claim 9, wherein the central processor downloads two-dimensional map information or three-dimensional map information from the cloud database, when the central processor downloads the three-dimensional map information, the central processor obtains a position in the three-dimensional map information corresponding to the first positioning information, and uses the position as new first positioning information for replacing the first positioning device.

15. The switching and fused calibration device according to claim 14, wherein the three-dimensional map information is three-dimensional point cloud information or RGB-D map information.

16. The switching and fused calibration device according to claim 14, wherein the two-dimensional map information is lane line positioning map information or traffic sign map information.

17. The switching and fused calibration device according to claim 9, wherein the first sensing device is an inertial sensing device, and the second sensing device is an optical sensing device.

* * * * *